United States Patent Office 3,579,384
Patented May 18, 1971

3,579,384
ELECTRIC CURRENT-PRODUCING CELLS
Sandors G. Abens, Philadelphia, Pa., assignor to
Honeywell Inc., Minneapolis, Minn.
No Drawing. Filed Mar. 19, 1969, Ser. No. 808,650
Int. Cl. H01m 17/02
U.S. Cl. 136—100        6 Claims

ABSTRACT OF THE DISCLOSURE

An improved current-producing cell system wherein the electrolyte comprises a solution of lithium-hexofluoroarsenate in methyl formate and the cathode is copper fluoride. The novel cell consists essentially of a lithium metal anode, a copper fluoride cathode, and an electrolyte solution of lithium-hexofluoroarsenate in methyl formate.

---

The invention herein described was made in the performance of work under NASA and is subject to the provisions of the National Aeronautics and Space Act of 1958, Public Law 85-568 (72 Stat. 435; 42 U.S.C. 2457).

BACKGROUND OF THE INVENTION

Field of the invention

The present invention pertains to current-producing cells and to method of generating electric current using the same. The cell may or may not be of the deferred action type depending upon whether or not one or more of the elements is held out of contact from the others until time of activation. Two or more cells may be associated and connected together electrically to form a battery.

Description of the prior art

Methyl formate has been previously disclosed as a useful solvent in an electric current-producing cell using a lithium metal anode. Pat. 3,380,855 shows a cell wherein the electrolyte comprises lithium perchlorate dissolved in methyl formate.

SUMMARY OF THE INVENTION

An object of the present invention is to provide an improved electric current-producing cell capable of operation over a wide range of temperature and having an ability to provide high rate of electric energy output. Lithium metal anode is used because of its high activity. If reduced activity is desired, the lithium may be associated with another metal, such as an alloy form with a less active metal. Lithium may also be in contact with another metal structure, such as nickel or silver screen, which serves as the anode conductor.

Even in short life batteries, stability of lithium in the electrolyte is of major importance. Decomposition products could form blocking films at the anode and cause cells to develop high operating pressures.

In accordance with the present invention, the electrolyte is comprised essentially of lithium-hexofluoroarsenate dissolved in methyl formate. In laboratory tests, lithium exhibited remarkable stability with this electrolyte and the pressures developed were within the acceptable range.

The conductivity of lithium-hexofluoroarsenate dissolved in methyl formate was tested at various concentrations. At room temperature 27° C.±1° C.) the following measurements were observed.

| Molar concentration, LiAsF$_6$/MF: | Specific conductance mmho/cm. |
|---|---|
| 1M | 29.7 |
| 2M | 40.2 |
| 3M | 33.5 |
| Saturation 3M>4M) | 29.5 |

The cathode is constructed of $CuF_2$ or a mixture of $CuF_2$ and $CuF_2 \cdot 2H_2O$. A finely divided conductive material, such as carbon black or graphite, may be mixed with the cathode material to render the mixture more conductive. Other materials such as paper fibers, cellulose acetate, or polystyrene may be incorporated into the cathode structure to act as binders.

Carbon, silver, copper, platinum, nickel or any other inert conductive material may be used as a cathode conductor, in intimate contact with the cathode composition.

Following are specific examples of electric cells constructed and operated successfully in laboratory. The invention will be better understood from the consideration of these examples, but it is not intended that they limit the scope of the invention in any way.

EXAMPLE 1

The anode is constructed by pressing a lithium metal sheet, .015" thick, into an expanded silver mesh. The sheet is then cut into 2" x 1.5" rectangles and wire leads are attached.

The cathode is made from a mixture of one-hundred parts $CuF_2$, ten parts $CuF_2 \cdot 2H_2O$, ten parts carbon, and one part polystyrene. The mixture is formed into a paste by adding xylene and applied to an expanded silver support, whereupon xylene is removed by vacuum drying. The cathode is shaped into 2" x 1.5" rectangles and wire leads are attached.

A cell stack in a sandwich form is constructed of four anodes and three cathodes, one of the cathodes being positioned between each pair of anodes. A glass filter mat, serving as a separator, is positioned between each of the adjacent plates and the composite structure is enclosed in a polyethylene case.

An electrolyte solution is prepared by dissolving lithium-hexofluoroarsenate in methyl formate in a ratio of two moles of lithium-hexofluoroarsenate per liter of methyl formate. The cell is activated by injecting a sufficient quantity of the electrolyte solution into the cell structure to place the electrodes into an electrolytic contact with each other.

An electric load is then connected to the cell and current withdrawn at six amperes at 35° C. Under these conditions the voltage decreased from an initial 2.69 v. to 2.00 v. in 0.58 hour.

EXAMPLE 2

A cell is constructed as in Example 1 and operated under the same conditions except that the current is withdrawn at one ampere. The cell voltage decreased from initial 3.30 v. to final 2.00 v. in 3.77 hours.

EXAMPLES 3-5

Same as Example 1, but the cells are operated at −5° C. and at various current loads.

| | Current, amperes | Initial voltage, volts | Time to 2.0 volts, hours |
|---|---|---|---|
| Example: | | | |
| 3 | 2.0 | 2.81 | 1.95 |
| 4 | 0.5 | 3.20 | 8.16 |
| 5 | 0.15 | 3.29 | 20.5 |

The efficiency of $CuF_2$ utilization in the above examples was in the range of 60% to 80%.

EXAMPLE 6

A series of discharge tests were conducted to determine cathode performance with lithium-hexofluoroarsenate as compared with $LiClO_4$. The construction of the cells was essentially as in Example 1, except that in half of the cells $LiClO_4$ was used instead of lithium-hexofluoroarsenate. The cells were discharged at 1, 8.3, and 20 ma./cm.$^2$ after a wet stand of thirty minutes at $-5°$ C. The following comparative results were obtained.

(a) At 1.0 ma./cm.$^2$:

| Percent CuF$_2$ utilization | Discharge potential | |
|---|---|---|
| | LiAsF$_6$ | LiClO$_4$ |
| 0 | 3.3 | 3.3 |
| 20 | 3.3 | 2.8 |
| 40 | 3.2 | 2.4 |
| 60 | 3.0 | |

The time elapsed to a final voltage of 2.5 v. at this current drain was 17 hours for lithium-hexofluoroarsenate, and 9 hours for LiClO$_4$.

(b) At 8.3 ma./cm.$^2$:

| Percent CuF$_2$ utilization | Discharge potential | |
|---|---|---|
| | LiAsF$_6$ | LiClO$_4$ |
| 0 | 3.2 | 3.3 |
| 20 | 3.2 | 3.0 |
| 40 | 3.2 | 2.9 |
| 60 | 3.1 | 2.7 |
| 80 | 2.0 | |

At this current drain the time elapsed to a final voltage of 2.0 v. was 3.5 hours for lithium-hexofluoroarsenate and 2.8 hours for LiClO$_4$.

(c) At 20.0 ma./cm.$^2$:

| Percent CuF$_2$ utilization | Discharge potential | |
|---|---|---|
| | LiAsF$_6$ | LiClO$_4$ |
| 0 | 2.8 | 2.8 |
| 20 | 3.0 | 2.8 |
| 40 | 3.1 | 2.7 |
| 60 | 3.0 | 2.4 |
| 80 | 2.9 | |

The time elapsed to a final voltage of 2.0 v. was 1.5 hours in the case of LiAsF$_6$ and 1.1 hours in the case of LiClO$_4$.

As noted from the above data, the cells using LiAsF$_6$ consistently performed better than those using LiClO$_4$, operating at higher efficiency and higher voltage. This is most pronounced at low current densities (1 ma./cm.$^2$) where the demonstrated superior lithium stability of LiAsF$_6$ allows longer discharge times at higher average potentials. At higher current densities, the higher conductivity of LaAsF$_6$ electrolyte probably accounts for the better discharge performance.

EXAMPLES 7–18

A three-plate cell test was assembled to determine the optimum LiAsF$_6$ concentration over a range of discharge rates. The cathode compositions were essentially as in Example 1, except that only five parts of CuF$_2$·2H$_2$O were used to one-hundred parts of CuF$_2$. Discharge data obtained from cells constructed in this manner was as follows:

(a) At .04 a.:

| Cell number: | Electrolyte concentration, moles/l. | Average discharge potential | Time to final voltage of 2.5 volts |
|---|---|---|---|
| 7 | 1 | 3.05 | 10.50 |
| 8 | 2 | 3.09 | 11.33 |
| 9 | 3 | 3.03 | 20.25 |
| 10 | Saturation | 2.99 | 19.42 |

(b) At .24 a.:

| Cell number: | Electrolyte concentration, moles/l. | Average discharge potential | Time to final voltage of 2.0 volts |
|---|---|---|---|
| 11 | 1 | 2.72 | 3.18 |
| 12 | 2 | 2.70 | 3.85 |
| 13 | 3 | 2.58 | 4.10 |
| 14 | Saturation | 2.32 | 4.85 |

(c) At .80 a.:

| Cell number: | Electrolyte concentration, moles/l. | Average discharge potential | Time to final voltage of 2.0 volts |
|---|---|---|---|
| 15 | 1 | 2.09 | 1.49 |
| 16 | 2 | 2.64 | 1.52 |
| 17 | 3 | 2.25 | 1.17 |
| 18 | Saturation | 1.54 | |

What is claimed is:
1. An electric current-producing cell having lithium metal anode, a cathode containing cupric fluoride and electrically conductive electrolyte solution of lithium-hexofluoroarsenate dissolved in methyl formate.
2. The cell of claim 1 wherein the concentration of lithium-hexofluoroarsenate is at least about one mole per liter of methyl formate.
3. The cell of claim 1 wherein the concentration of lithium-hexofluoroarsenate in methyl formate is at least one mole per liter and not more than four moles per liter.
4. An electric current-producing cell comprising:
   an anode constructed by pressing a lithium metal sheet into an expanded silver mesh;
   a cathode consisting of CuF$_2$, CuF$_2$·2H$_2$O, carbon, and polystyrene;
   a separator positioned between said cathode and said anode; and
   electrically conductive electrolyte solution of lithium-hexofluoroarsenate dissolved in methyl formate.
5. An electric current-producing cell of claim 4 wherein said cathode is a mixture of one-hundred parts CuF$_2$, ten parts CuF$_2$·2H$_2$O, ten parts carbon, and one part polystyrene.
6. A cell of claim 5 wherein said electrolyte solution consists of lithium-hexofluoroarsenate in methyl formate in the ratio of two moles of lithium-hexofluoroarsenate per liter of methyl formate.

References Cited

UNITED STATES PATENTS

| 3,279,952 | 10/1966 | Minnick | 136—100 |
| 3,380,855 | 4/1968 | Nahy et al. | 136—100 |
| 3,415,687 | 12/1968 | Methlie II | 136—100 |
| 3,468,716 | 9/1969 | Eisenberg | 136—100 |

WINSTON A. DOUGLAS, Primary Examiner

C. F. LEFEVOUR, Assistant Examiner

U.S. Cl. X.R.

136—155